H. G. BEEDE.
MILLING MACHINE.
APPLICATION FILED MAR. 22, 1918.
1,341,034. Patented May 25, 1920.
8 SHEETS—SHEET 1.
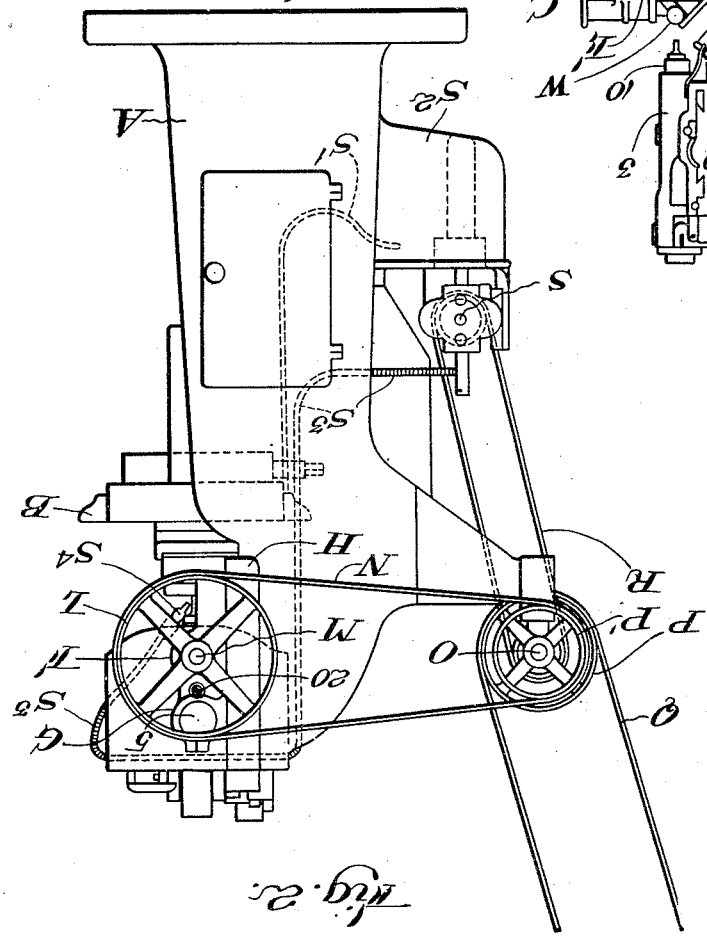
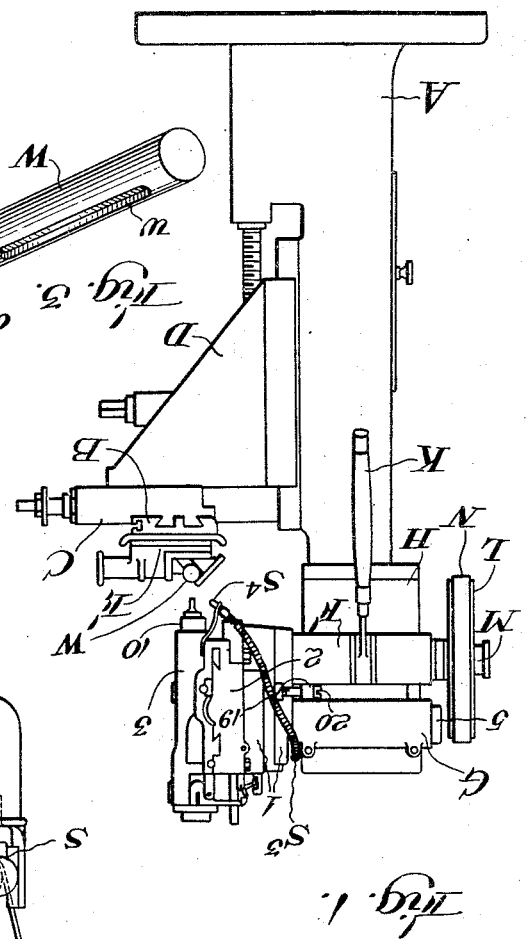
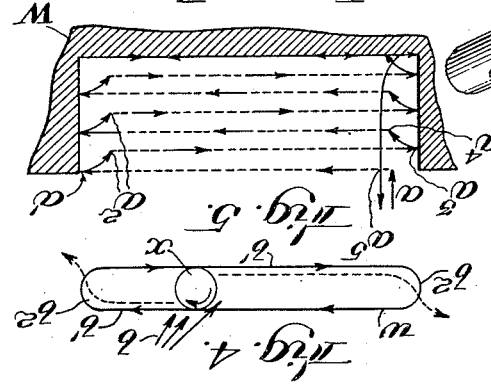

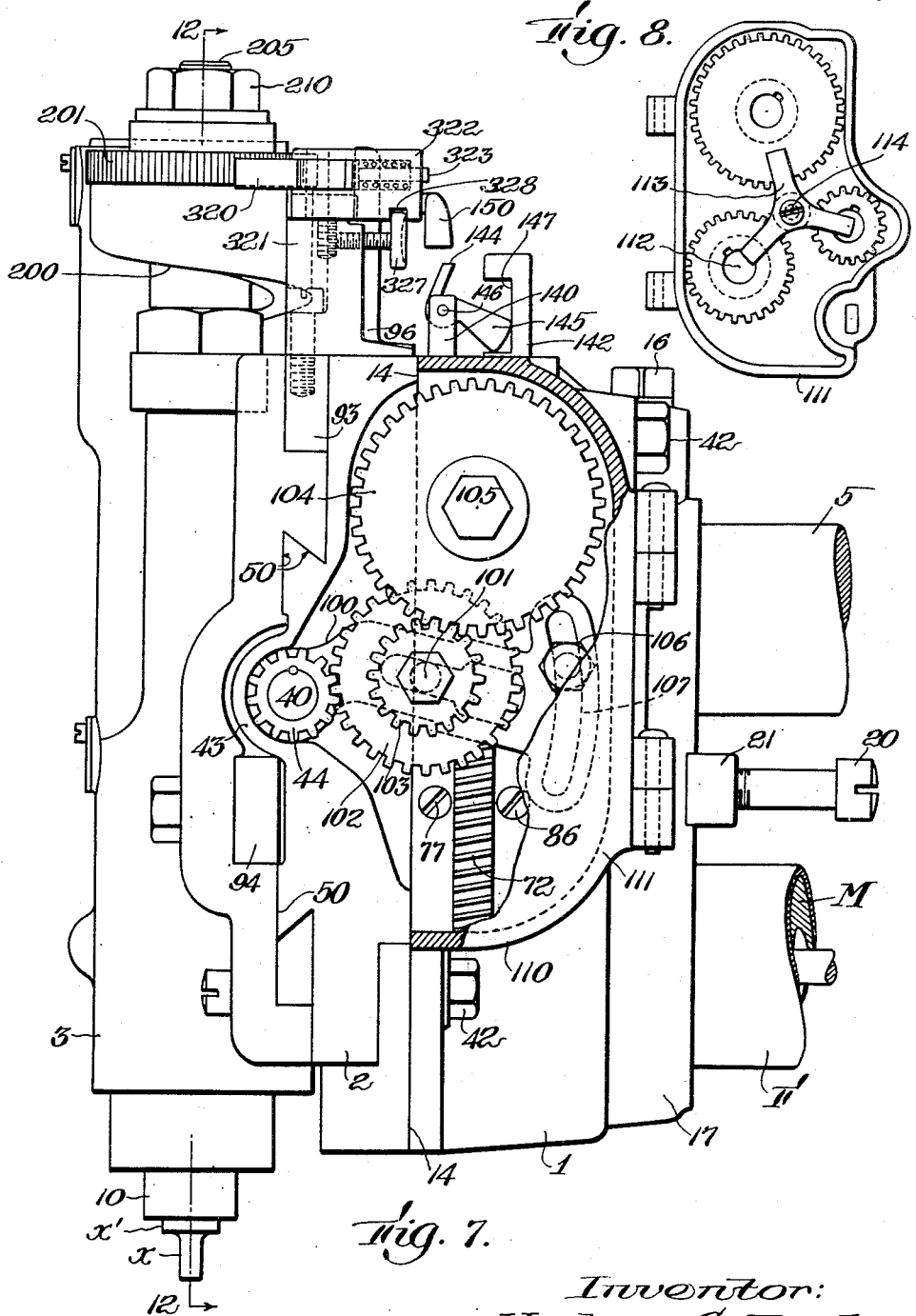

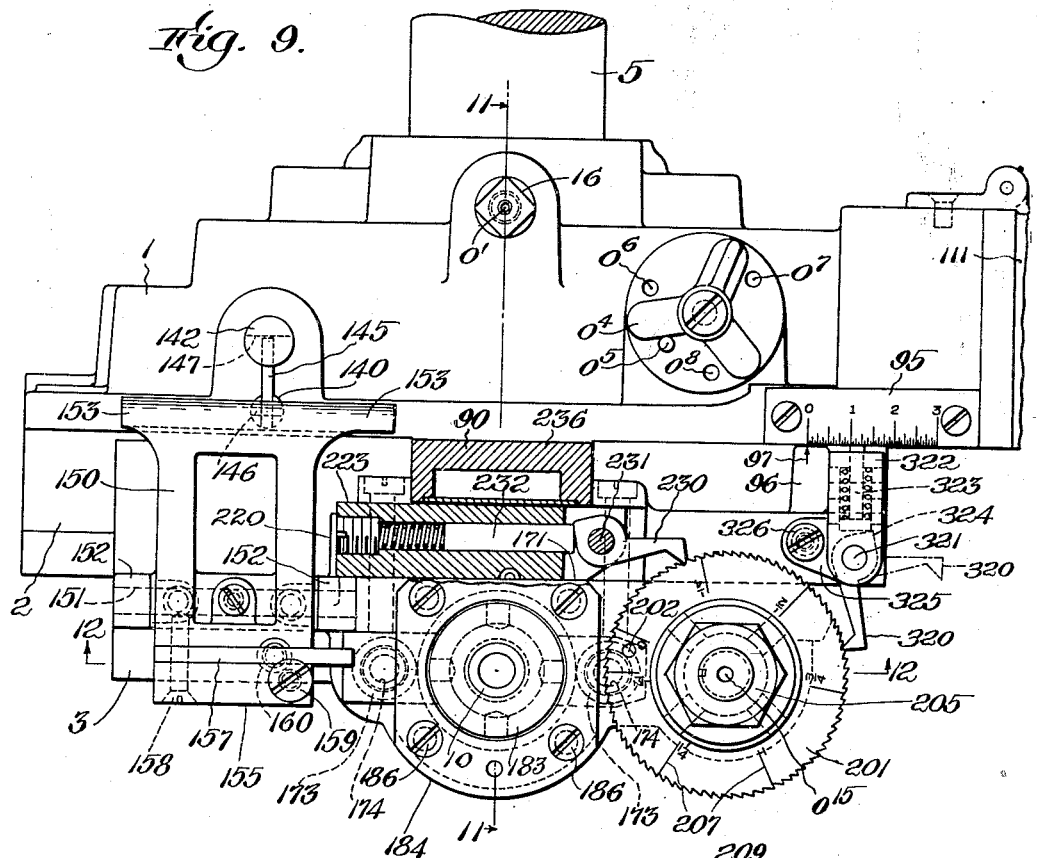
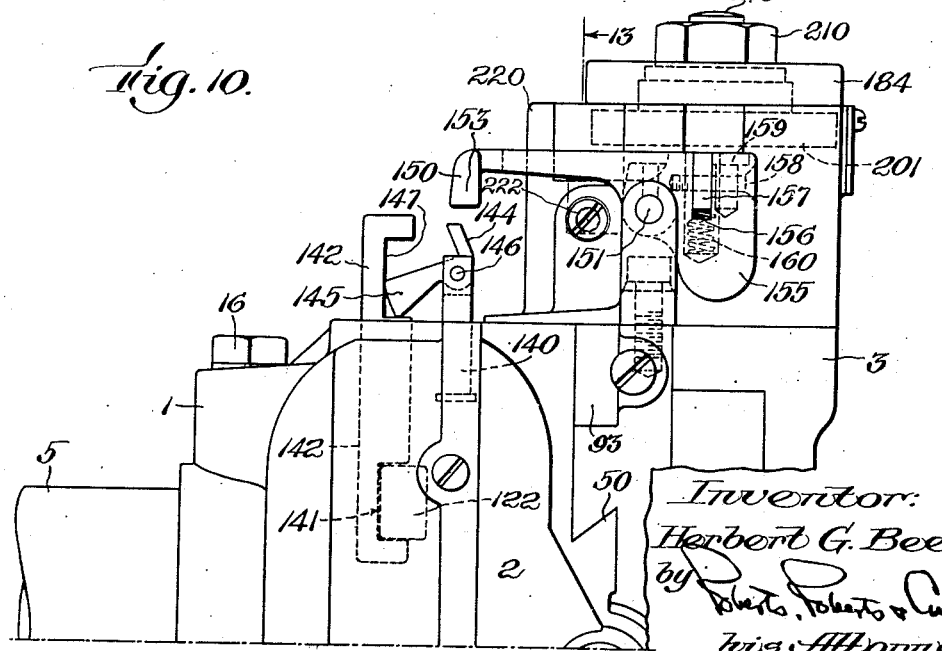

H. G. BEEDE.
MILLING MACHINE.
APPLICATION FILED MAR. 22, 1918.

1,341,034. Patented May 25, 1920.
8 SHEETS—SHEET 5.

Inventor:
Herbert G. Beede,
by Roberts, Roberts & Cushman
his Attorneys.

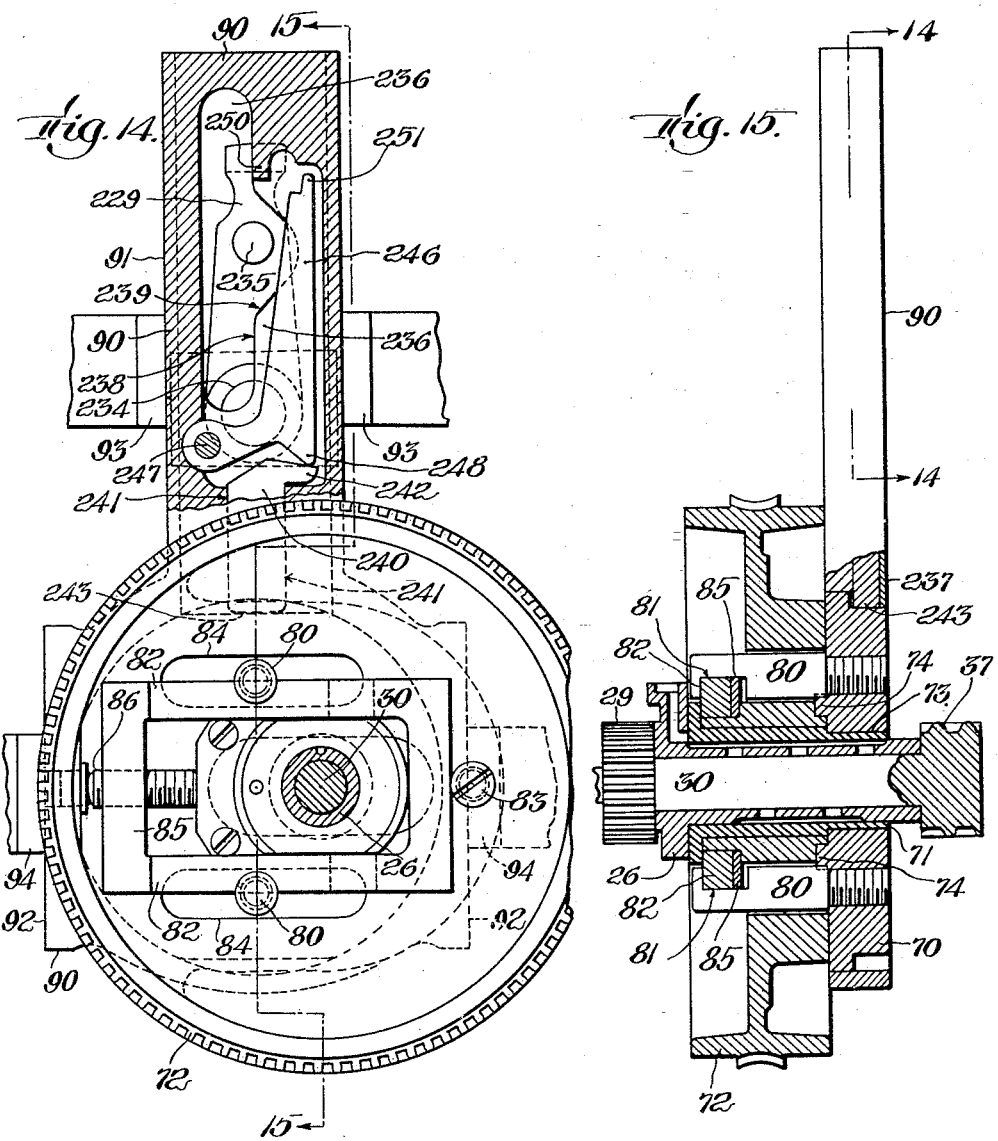

UNITED STATES PATENT OFFICE.

HERBERT G. BEEDE, OF PAWTUCKET, RHODE ISLAND.

MILLING-MACHINE.

1,341,034.　　　　　Specification of Letters Patent.　　Patented May 25, 1920.

Application filed March 22, 1918. Serial No. 223,923.

*To all whom it may concern:*

Be it known that I, HERBERT G. BEEDE, a citizen of the United States of America, and resident of Pawtucket, in the county of Providence and State of Rhode Island, have invented new and useful Improvements in Milling-Machines, of which the following is a specification.

This invention relates to milling or shaping metal by machinery and to mechanism for milling also applicable without substantial change to other uses.

Heretofore, as familiar to those skilled in the use of machine tools, shaping, surfacing, grooving, slotting, and in general making by cutting steps predetermined changes in exterior or interior surfaces of metal and other materials has best been done with the aid of milling machines essentially comprising a rotary cutter, and means for positioning the material or work under operation in respect to the rotating cutter by permitting the relative position of the cutter and the work to be varied to determine the shape and extent of the surface or surfaces formed by the cutter. Sometimes relative motion between the cutter and the work is secured by moving a clamp or holder for the work, or by moving the cutter in respect to the work, or by motion of both the cutter and the work in different dimensions. When automatic operation requiring either much power or complexity of motion is involved, it has been the custom to provide for moving the work against a relatively fixed place for operation of the rotary cutter or cutters; or to provide for a simple movement of the work such as rotation or reciprocation, in combination with a rotating cutting tool movable in another path than that of a point in the moving work.

A principal object of this invention is to provide improved means for shaping a mass of material held in a relatively stationary but adjustable position by motions of a driven cutter movable in at least two dimensions in respect thereto. Other objects are to provide milling mechanism adapted to perform a relatively complete milling operation automatically by control of the relative positions of the work and of a rotating cutter, the shaping motions of the cutter and work-holder relative to each other being given to one of said parts only. Other objects are to provide improved means for forming interior surfaces defining a solid open at one or more sides, such as a spline groove, key-seat, tang slot, or other shaped slot or groove, by the automatic operation of a milling-head controlling the successive positions of a cutter rotating therein; to strengthen, improve, and simplify the mechanism for holding and automatically operating a milling cutter; and to provide for entering the cutter upon, feeding the cutter in respect to, moving the cutter laterally in relation to and withdrawing it from work, and for causing the operation of the cutter-moving instrumentalities to cease at a predetermined time, or upon the completion of a predetermined operation, and the cutter to be withdrawn.

Other objects are to provide a milling machine adapted automatically to operate by rotation of a vertical cutter-spindle to perform accurately and indefinitely to repeat, if desired, a cutting operation in a space within boundaries of and beneath the upper surface of the work in such a manner as not to require attention by the operator, and to provide for accomplishing any or all of these objects, in one preferred form of the invention, by a strong, compact and effective attachment applicable to and coöperating with the frame, back-shaft, spindle, knee, saddle, oil-circulating device and other parts of existing milling machines.

I will now describe the invention in connection with one illustrative species only of the genus of my invention.

In the accompanying drawings,—

Figure 1 is a side elevation and Fig. 2 a rear elevation of the said existing machine illustrating one form of the new device applied thereto;

Fig. 3 illustrates a product selected to illustrate one kind of work done;

Fig. 4 is a diagram illustrating chip clearance and oil-stream flow for this class of work;

Fig. 5 is a diagram illustrating preferred automatic motions of the cutter;

Fig. 7 is a right side elevation of the milling head;

Fig. 8 is a detail interior view of the gear box cover;

Fig. 9 is a plan partly in section on line 9 of Fig. 11;

Fig. 10 is a left hand side elevation of the upper part of the milling head showing the traverse and feed stop devices;

Fig. 14 is a rear view of the traverse eccentric and traverse arm, showing the eccentric adjustment locking means, partly in section on line 14—14 of Fig. 15; and Fig. 15 is a section on the line 15—15 of Fig. 14.

Figure 6:
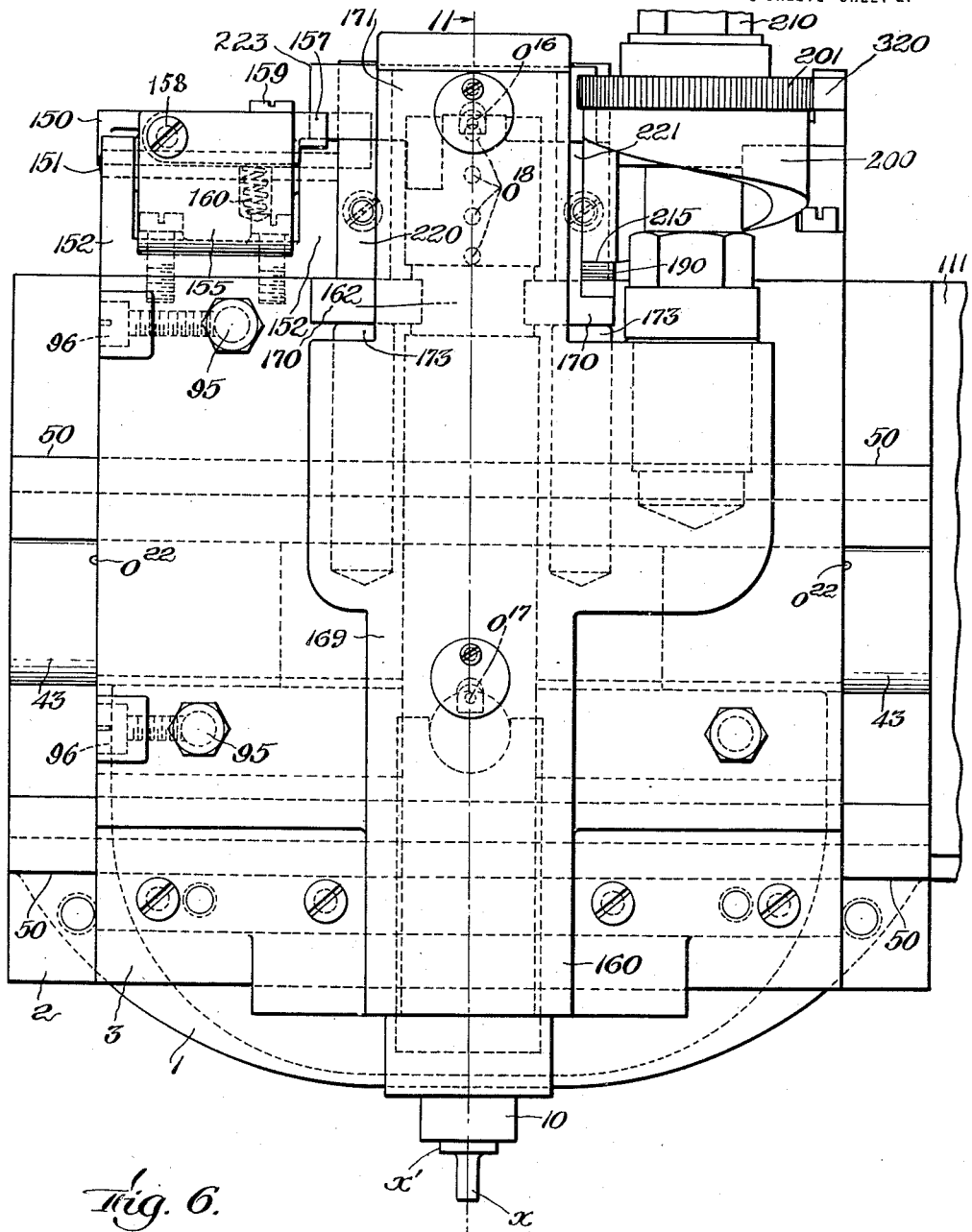
Fig. 6 is a front elevation of the vertical milling head showing the spindle, carriage and parts of the motion-head, depth feed and traverse and feed stop devices.

Referring now to Figs. 1 and 2, any suitable type of frame, such as a standard A having a work table B preferably adjustable on the standard vertically and in two horizontal dimensions, may be employed. As shown, the table B is as usual movable longitudinally on a saddle C movable transversely on a knee D vertically adjustable on ways on the standard A. Table B may have on it clamping means such as the vise E for holding small work on the table.

According to the type of base milling machine elected to be shown, the spindle bearing F and overhanging arm clamp G are adapted to be worked up and down by means including a hand-lever K, in a manner convenient for first adjusting the relation of the work and the cutting tool before operation begins. A main drive pulley L fast on the hollow horizontal spindle M, Figs. 7 and 11, which spindle normally receives and drives the milling cutter or cutters by means of a suitable collet and draw-bar, is driven by belt N from the back-shaft O, which may be provided with change-speed pulleys P, P′, one of which is driven as usual, as from an overhead counter-shaft by belt Q. Means for lubricating the working cutter, as usual, may comprise the oil pump S driven by belt R to force through a flexible delivery pipe S³ and nozzle S⁴ oil collecting in tank S² by gravity flow through a flexible pipe S′ from a trough surrounding table B. Nozzle S⁴ is arranged as usual to deliver oil against the working cutter.

Instead of, and for easy substitution for, the usual mandrel or cutter driven by spindle M, the illustrated form of the invention provides a milling head adapted to be driven by one of the operating parts of the existing train of mechanism mentioned above, preferably by said horizontal spindle M, for supporting and working a preferably vertical spindle provided with a milling cutter. As a whole, the milling head and its secondary operating and supporting means beyond the actuating connection to the existing parts is arranged to be readily attached to and removed from the machine, and preferably comprises a train of mechanism for rotating and for automatically giving shapping movements to the cutter spindle, including a driving gear 4 adapted to be mounted on spindle M, see Fig. 11; supporting means such as an arm 5 to take into the clamp G; a motion head 1, including an intermediate frame 2, and a traversing carriage 3 for the vertical spindle 10, as well as the contained connections now to be described for operating the spindle 10 and carriage 3 to effect the broader purposes of the invention.

1. *The motion-head and spindle-driving means.*

The milling head, including the parts generally denoted by 1, 2 and 3, comprises in the parts 1 and 2 a relatively fixed motion head for guiding, controlling and operating the devices of the traversing carriage 3.

The head may comprise (see Figs 8, 9, 10 and 11), as shown, in the part 1 a rectangular hollow casting having a plane front face at 14 and at the back a boss 15 in a bore in which a reduced part of the arm 5 is held rigidly by a heavy set-screw 16. In use the arm 5 replaces the ordinary overhanging arm in the clamp G. A bore 18 in a boss 17 communicating with the cavity of the casting is adapted to fit over the outer end of the bushing F′ of the bearing F for the spindle M, thereby to position the part 1 and its attachments against rotation on arm 5 as a center and to house the primary driving gear 4. The milling head may if desired be further secured to the base machine with which it is used; for instance, a bar 21 suitably fastened in a groove in the back of the part 1 may be bored and tapped for a tightener screw 20 adapted to take through a hole in a frame-web 19 of the machine between the bearing F and the clamp G, and so positively hold the milling head in place.

The gear 4 is attached to the spindle in any manner made convenient by the particular construction of the spindle found in the machine to which the milling head is to be applied. As shown, the gear is cut on the periphery of an internally-coned cap 22 drawn to a seat on the externally tapered end of the spindle M by a draw-bar 24 taking into a threaded boss 23 of the cap.

Figure 11:
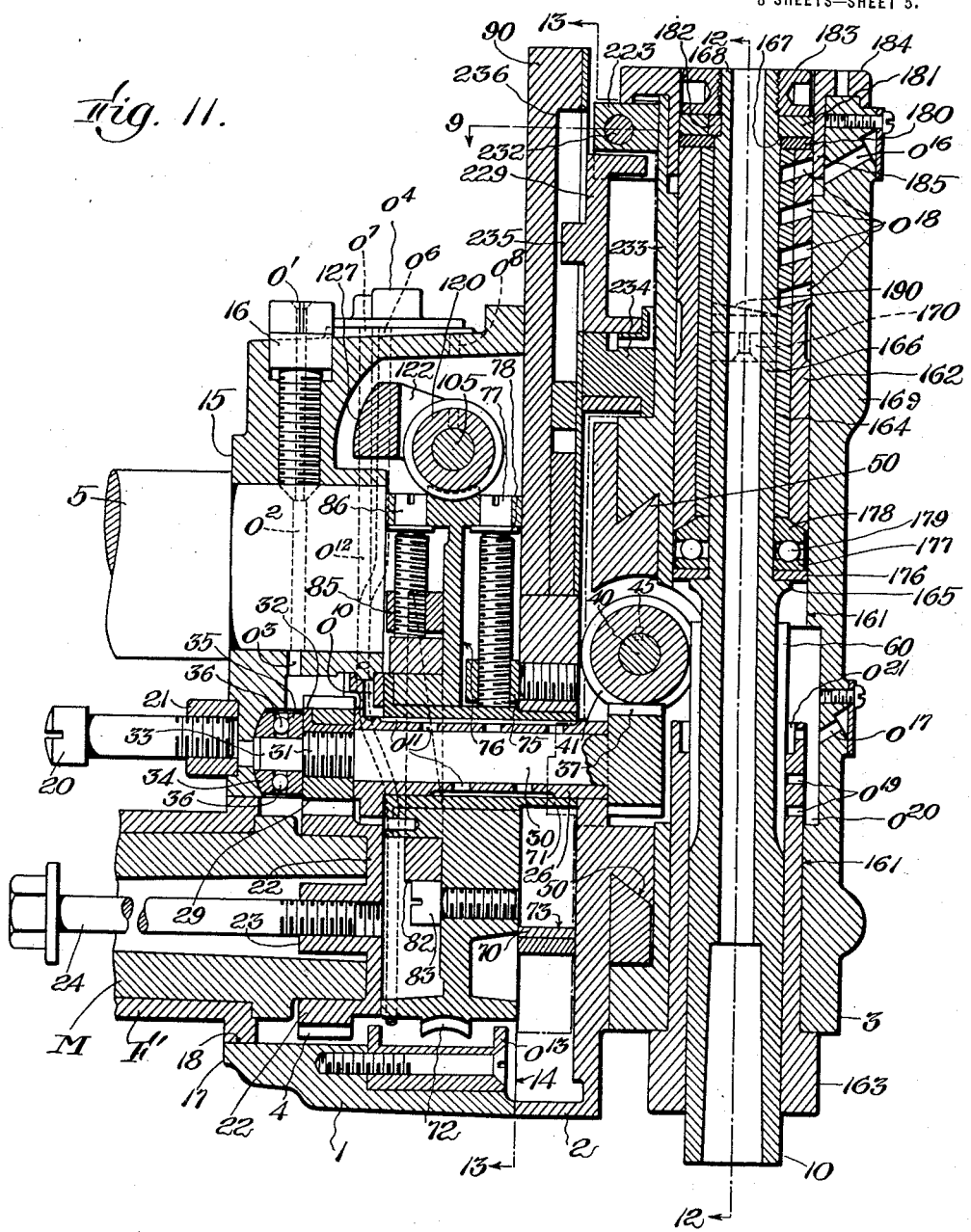
Fig. 11 is a vertical central section on the line 11—11 of Figs. 6 and 9.
Figure 13:
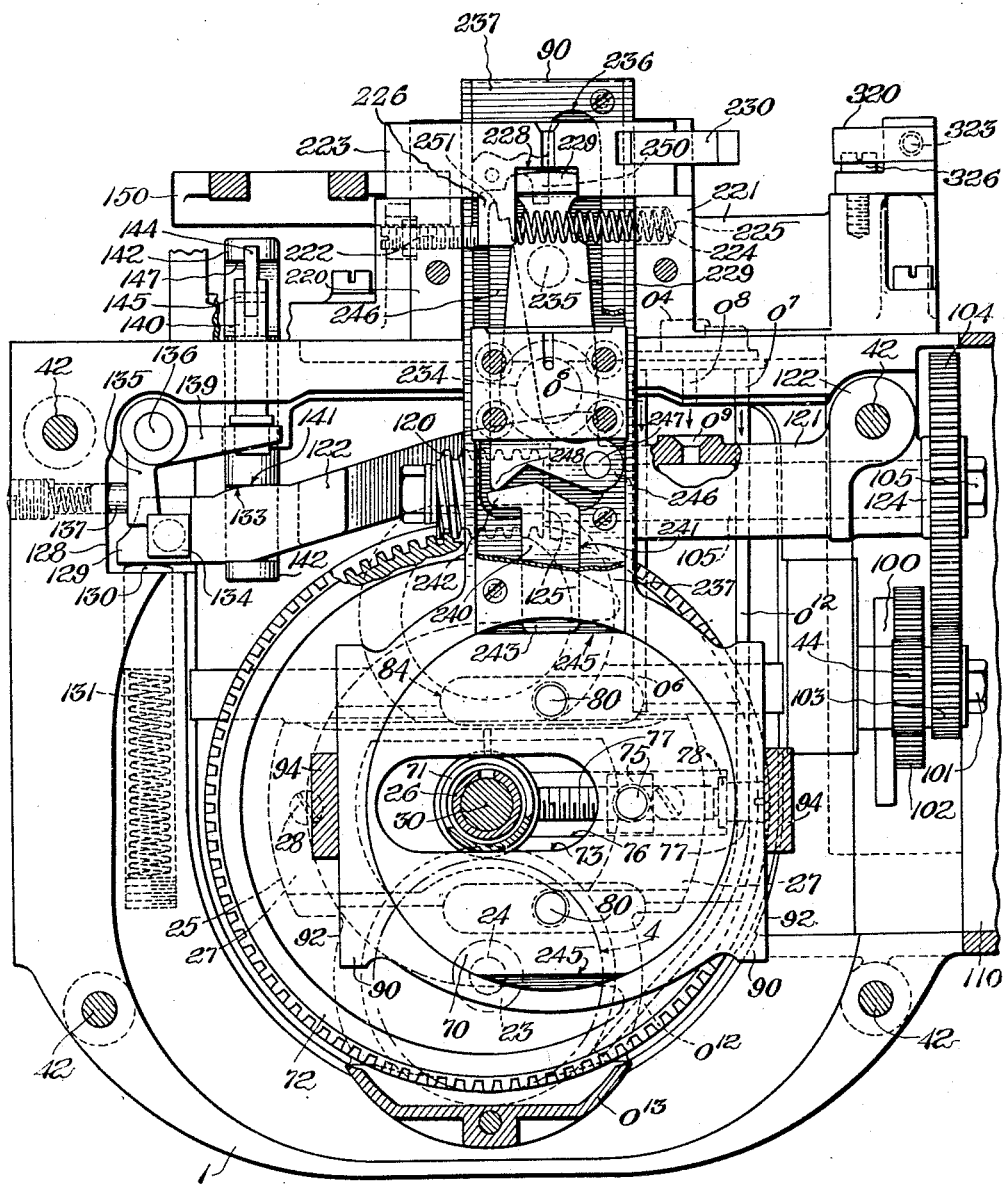
Fig. 13 is an elevation partly in section on the line 13—13 of Fig. 11 of the motion-head, traverse-arm, feed, and traverse stop-devices, the intermediate frame-section being removed.

Power for operating the cutter and its traverse and feed devices is transmitted from the gear 4 through a gear 29 to a driving shaft 30, Figs. 11 and 13, and thence, as will presently be described, through transmission gearing continuously operative in any position of the carriage 3 or spindle 10 to the driving spindle and other operated parts. The shaft 30 is suitably positioned, preferably as shown, horizontally and centrally of the part 1 and between the axial lines of the spindle M and arm 5. As best shown in Figs. 11 and 13, the bearing for shaft 30 may be a bronze sleeve 26 having integral wings 27 held in a circular seat 25 of part 1 by screws 28 and at its front end supported in a bore in the part 2. Gear 29 may be screwed on the reduced end 31 of and keyed to shaft 30 at 32, and so provide a forward thrust stop against bearing 26 for the shaft and gear. Normally thrust on the shaft 30 is rearward, and is taken by antifriction rings, which may be ball-races 34, 35 for balls 36, surrounding a reduced end 33 of said shaft. The rearward ring 34 as shown is adapted to a seat in the part 1.

Shaft 30 carries at its outer end a spiral gear 37 preferably integral with the shaft.

An intermediate shaft 40, preferably horizontal and at right angles to the shaft 30, has splined at 45 thereon for limited axial movement relative to the shaft, a comparatively long spiral gear 41 meshing, about midway of its length, with the gear 37, so that intermediate gear 41 and its shaft 40 are constantly driven at a predetermined rate related to the speed of the spindle M.

Referring now to Figs. 7, 11, 12 and 13, part 2 of the motion-head may be a casting adapted at the back to fit on the plane front face 14 of the part 1 on which it is firmly held by the screws 42, Figs. 7 and 13. The part 2, which incloses the cavity in part 1 except for an opening for the bearing sleeve 26, spiral gear 37 and intermediate gear 41, and an opening at the top presently to be referred to, is provided at each side with bearing bosses 43 bored to receive bushings 47 for shaft 40 and counterbored to receive at the right end, Figs. 7 and 12, a pinion 44 fast on or integral with the shaft, and at the left end to receive a nut 46 screwed on the reduced and threaded end of the shaft. Antifriction rings 48 loose on the shaft 40 between the ends of intermediate gear 41 and the inner faces of the bearings for the shaft are adapted to take axial thrusts of the gear in either direction independently of the shaft 40. The front face of the part 2 is formed with slide-ways for the traversing carriage 3, such as the horizontal dove-tail gib 50.

The vertical cutter spindle 10 is driven directly from the intermediate gear 41 by a spiral gear 60 intermeshing therewith and preferably formed integrally with the spindle. Like gear 41, the gear 60 is relatively long. It will therefore be obvious that the spindle may be traversed through the length of gear 41 or fed vertically through the length of gear 60 without interrupting the driving connection 4, 29, 30, 41, 60.

The shaft 40 driven in time with this train is employed as the driver of a change-gear train and other mechanism adapted to traverse the carriage 3 through a predetermined adjustable reciprocal path at variable rates, to feed the spindle 10 downwardly in predetermined relation to the traverse at a predetermined changeable rate, and to occasion withdrawal of the cutter and stoppage of the feed and traverse after a predetermined number of revolutions of the cutter or after a predetermined depth of cut, as desired.

The feed mechanism is adapted to travel with the carriage 3, and will be described below.

2. *The variable traverse mechanism.*

The character of the reciprocating motion adapted to be given the cutter transversely of its axis of rotation is important to the effectiveness of the automatic operation as a whole, the object in general being to obtain as rapid a measured traverse of the cutter to remove a new part of the material from the cut being made in the work as possible, with due regard to avoidance of breakage, chattering and overheating. Both the lateral or traverse motion and the vertical or feeding motion should be predetermined with allowance for the rotative speed of the cutter, the shape and size of the cutter and the hardness and other qualities of the material. To obtain the best performance not only the extent of the traverse and the depth of the feed, by which the size of the shaped cut in the material is determined, should be readily adjustable, but the ratio of traverse to cutter revolutions, and the time and the extent of vertical feed in relation to the place in the traverse should be carefully predetermined to suit the particular task being performed. This invention provides improved means for relating these elements of the motions of the cutter, comprising effective adjustment from no traverse to a maximum for reciprocating the carriage 3. For reasons stated below, a reciprocation of the carriage 3 markedly slower near the limits of the traverse than at its middle is desirable.

A connection to the carriage 3 for the above reasons is adapted to be acted upon by an eccentric rotating part on the motion head, so that the carriage is reciprocated rapidly in the middle of its traverse and more slowly toward the end prior to and after the reversal of motion at the end of the reciprocation.

In order to control the extent of the surface of the work traversed by the cutter for each stroke of the carriage 3 the rotating part on the motion head is adapted to be adjusted. Preferably as shown, see Figs. 11, 13, 14 and 15, the rotating part is an eccentric disk 70, Figs. 11 and 13, arranged to be adjusted for extent of eccentricity with respect to a bushing 71 conveniently rotating coaxially with driving shaft 30 on a bearing on the outer surface of bearing sleeve 26.

Preferably the means for rotating the eccentric element 70 of the traverse mechanism comprises a relatively large gear, as shown a worm gear 72 on the bushing 71, on the face of which gear the disk 70 is mounted to be adjusted radially and clamped in adjustment. The disk 70, see Figs. 13 and 15, may have a central radial slot 73 and gibs 74 parallel with slot 73 to slide in grooves on the face of gear 72, and be provided with a nut 75 fixed in line with the center of slot 73 and adapted to slide in a radial groove 76 of the gear 72, for adjustment by a screw 77 longitudinally held between the bushing 71 and a peripheral hole for the screw-head by a flange 78, so that the accessible head of the screw may be turned to adjust disk 70 radially on the face of the gear 72.

Disk 70 can be clamped in adjusted position, for instance by pins 80, Figs. 11, 14 and 15, fast on the disk and slotted at 81 to take over a U-shaped wedge 82 held on the back of gear 72 by engagement with said slots 81 and a screw abutment 83, the said pins 80 taking through slots 84 in the gear 72. Wedge 82 is tightened to draw disk 70 through pins 80 against its seat on gear 72 by a mating U-wedge 85 tapped for a left-hand flange-headed screw 86 having its head in a peripheral hole near screw 77. The heads of screws 77 and 86 can be reached from the right-hand side of the motion-head, see Fig. 7, whenever the traverse motion is stopped, for rapid adjustment and clamping of the disk 70.

Referring to Fig. 9, the adjustment by means of screw 77 can be made accurately to control the dimensions of the traverse by aid of a scale 95 fast on the part 1, read against an index 97 on the lug 96 on the carriage 3. When the screw-head is accessible the arm 90 is at its greatest displacement to the right; the scale being graduated to half-inches, the dimensions of the traverse, which is twice the displacement shown by the scale, may directly be read on the scale in inches as shown by the position of the index mark.

For mechanical simplicity, strength, and compactness, as well as to avoid asymmetric difference in the rate of the traverse at different ends of the stroke, the operating connection from the eccentric 70 to the carriage 3 is preferred to be made as an arm 90 having freedom of motion on the carriage at an angle to its traverse, but it will be obvious that for some purposes a pitman or other linkage might be substituted. Arm 90 has parallel faces 91 and 92 for engagement with upper guide lugs 93 and lower guide lugs 94 respectively on the carriage 3. Preferably these lugs on one side are adjustable, for instance being held by clamp screws 95, Fig. 6, loose in bores in carriage 3 for lateral adjustment by screws 96 to take up wear.

Arm 90 is suitably bored to fit over disk 70 and projects upwardly through an opening in the top of the part 2 of the motion-head wide enough to permit reciprocation of arm 90 and carriage 3 obtainable when disk 70 is in its most eccentric position.

In the preferred form illustrated, arm 90 is utilized as a carrier for parts of a feed mechanism presently to be described.

The traverse mechanism comprising the disk 70 and the arm 90 and the connection to the feed mechanism are arranged to be actuated in a predetermined and variable relation to the speed of rotation of the spindle 10. For instance, the shaft 40 upon which the intermediate gear 41 serving through the gear 60 to drive the spindle 10 is mounted, provides a convenient connection for rotating the gear 72 through the following mechanism.

Referring now to Figs. 7, 11 and 13, the gear 44 on the shaft 40 is arranged to drive a change-speed gearing best seen in Figs. 7 and 13, which may conveniently comprise a swing plate 100 having an adjustable stud 101 carrying attached gear 102, in mesh with the gear 44, and 103, serving as a pinion for a gear 104 fast to a drive shaft 105. The swing plate 100 is pivoted on the shaft 40 at one end and locked to the part 1 by screw 106 in sector slot 107.

The gear train 44, 102, 103 and 104 may be housed in casing 110 in part formed integrally with the back part 1 and the front part 2 of the motion-head. To protect the gearing a cover 111, Fig. 8, may be hinged in any convenient manner on the part 1. As shown in Fig. 8, change-gears to replace the gears 102 and 103 may conveniently be carried on studs 112 on the inner face of the cover 111, and be held in place by a three-armed turn button 113 pivoted on the stud 114.

The shaft 105 is provided with a worm 120 adapted to engage the worm wheel 72 when the traverse motion is operated.

3. *The automatic stop motion for traverse and feed.*

The traverse motion is automatically stopped when the operation is completed, and preferably stoppage is effected by providing for removing the worm 120 from contact with its worm gear 72 when stoppage is to be effected. The worm 120 may therefore be constantly actuated.

For the above and other purposes a movable bearing 121 for the shaft 105, see Figs. 11 and 13, is provided on a rocker arm 122 pivoted as on the upper right hand screw 42, Fig. 13, so that arm 122 may be lifted about the screw 42 as a center without taking out of mesh the gear 104 and change-gear pinion 103 in engagement with it as permitted by the slight lateral clearance between the faces of gears 104 and 102. The bearing 121 for the worm shaft 105 provides at its ends faces for antifriction disks 124 and 125 adapted to prevent longitudinal movement of the worm and shaft with respect to the bearing. Arm 122 and bearing 121 are preferably an integral casting of which the portion 127 is offset to the rear, see Fig. 11, the arm 122 terminating in a recess 128 of the part 1 in a foot 129 normally pressed upwardly by spring plunger 130 in a bore in said part 1 and under the influence of an adjustable spring 131. Arm 122 is provided with a round enlargement 133 near its end and with a square edged lug 134 adapted to engage a notch in a detent 135 pivoted at 136 on said part 1, and urged into engagement with lug 134 by spring plunger 137. Detent 135 thus holds the arm 122 and the bearing 121 in position to maintain the worm gear 72 and the worm 120 normally in engaging relation.

For automatic stoppage at completion of work the detent 135 is provided with an arm 139 adapted to be engaged by a stopping plunger 140 in a vertical bore in the part 1, Figs. 5, 6, 9, 10 and 16.

The enlargement 133 of arm 122 takes into a slot 141 in a starting plunger 142 projecting upwardly through a bore in the part 1 and adapted to be pressed down by hand to engage the worm 120 and gear 72, the detent 135 then locking the arm 122 in its operative position (Fig. 13).

Stopping plunger 140 is provided with a bell-crank 144, 145, pivoted in a longitudinal slot at 146, the arm 144 being a longitudinal extension of the stopping plunger 140, and the arm 145 taking freely into a slot 147 in the starting plunger 142.

Whenever the arm 142 is pushed downwardly by a knock-off lever 150, pivoted at 151 between lugs 152 on the upper surface of carriage 3, detent 135 is withdrawn, and the consequent upward motion of arm 122 caused by spring plunger 130 disengages the worm 120 from gear 72. Starting plunger 142 is lifted with the arm 122, rocking the bell-crank 144, 145, about pivot 146 and withdrawing arm 144 from the path of knock-off lever 150, which is thus permitted to descend further after having performed its function, to prevent binding its actuating means.

Lever 150 is normally kept elevated at its rear end, so as not to strike the arm 144, by an overweighted front end 155 laterally slotted at 156 to receive a contact-piece 157 pivoted at 158 and held upwardly by a spring 160 in a bore in the enlarged end 155 against an adjusting screw 159 for delicately adjusting the contact piece, the overhanging end of which is in the path of a lug 170 on the vertical carriage for the cutter spindle 10 and adapted to be struck on upward movement of said carriage. The rear end of lever 150 may have lateral extensions 153 to prevent any adjustment of the traverse of carriage 3 from taking it out of reach of arm 144, but ordinarily the lever 150 is actuated when the carriage 3 is at a particular place in its traverse, and the lever 150 may be wide enough only to be over stopping plunger 140 when the carriage is at those places.

4. *The cutter, spindle, vertical carriage and feed motion.*

Figure 12:
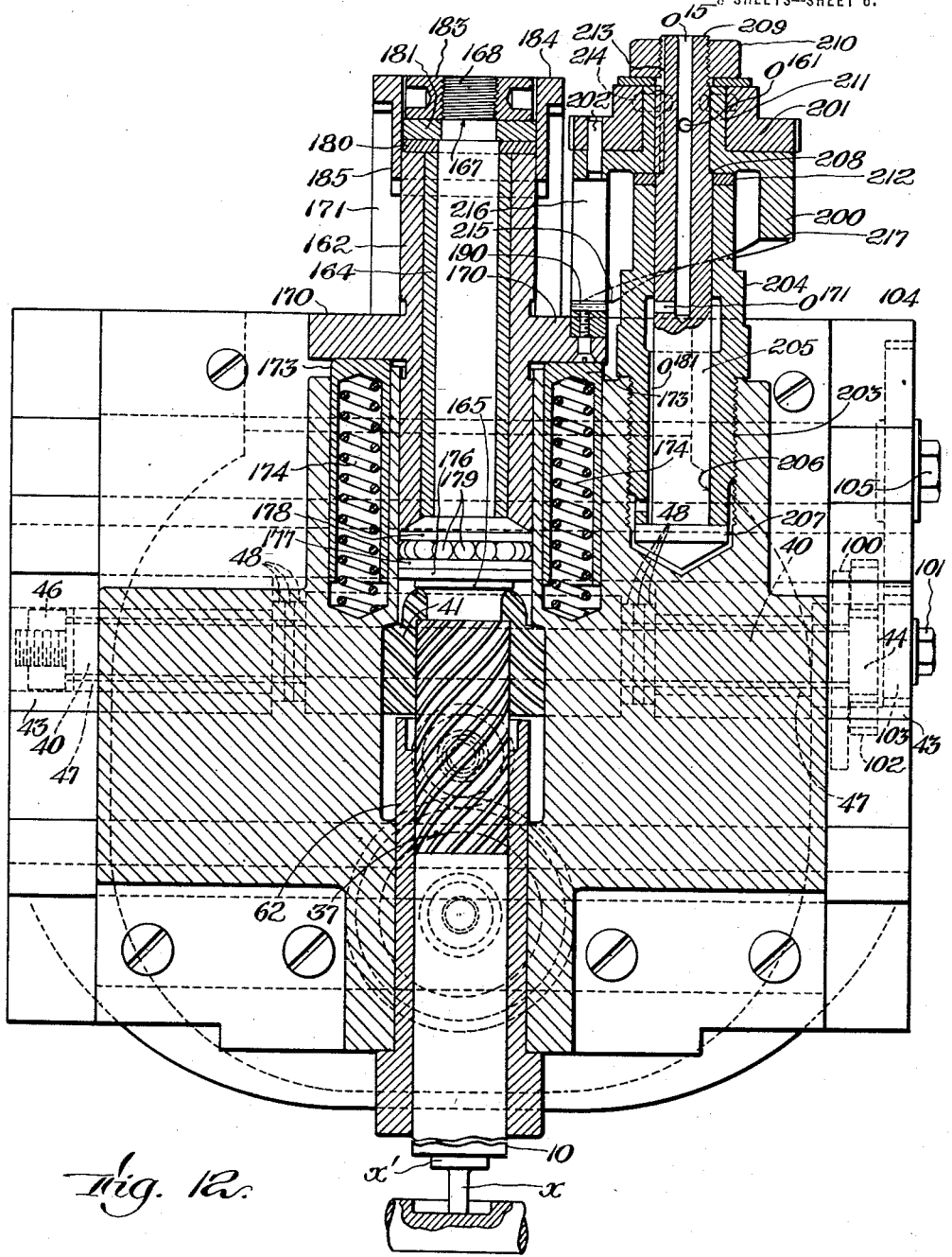
Fig. 12 is a vertical section through the traversing spindle carriage on line 12—12 of Figs. 9 and 11.

Carriage 3, see Figs. 6, 11 and 12, is provided with a central vertical rib 169 vertically bored through at 161 to provide a slideway for cutter spindle 10 and a carriage 162. At the bottom bore 161 is bushed at 163 to provide a long rotative and slide bearing for the lower part of the spindle 10 and gear 60, which is of the same external diameter as the spindle 10. Carriage 162 is bored to receive a bushing 164 for a rotative bearing for the upper part of spindle 10, which is provided with a shoulder 165 and may have a reduced upper part 166, terminating in a shoulder 167 and a further reduced threaded end 168.

Referring now to Fig. 12, the carriage 162 is held against rotation in bore 161 by lugs 170 projecting through vertical laterally-placed slots in the upper extension 171 of the rib 160.

The lugs 170 are acted upon on their under sides by tubular spring plungers 173 in bores in the carriage 3. The springs 174 for these plungers are sufficient to more than counterbalance the weight of the carriage 162, the spindle and the cutter, and are relied upon to withdraw the cutter from the work when permitted to act.

The spindle 10 is held against longitudinal motion with respect to the carriage 162 by suitable upper and lower thrust bearings, of which the lower transmits downward thrusts given to the carriage 162 to feed the cutter into the work for a new cut. Preferably the lower thrust bearing is a ball bearing comprising a disk 176 on the shoulder 165 of the spindle and lower ball race 177 for balls 179 on the disk 176 and an upper ball race 178, the upper face of which may be conical to fit the conical lower end of the carriage 162.

The upper bearing comprises an antifriction disk 180 free on the upper end of the carriage 162, a disk 181 splined at 182 to the reduced upper end 168 of the spindle, and an accessible pin-wrench nut 183 threaded on the end 168 for adjusting the vertical position of disk 181 and hence tightening both the upper and lower thrust bearings against the respective faces of the carriage 162, to take up wear.

A cap 184 attached to the upper part 171 of the rib 169 by screws 186 may be integral with a bushing 185 for the vertically movable carriage 162 and serve to limit the upward motion of the lugs 170.

The left-hand lug 170 toward the upward end of its path encounters the contact-piece 157 of the lever 150 and thereby trips the traverse-motion stop devices above described.

The right hand lug 170 carries a wear-plate 190 or other follower adapted to follow the contour of a feed cam 200 fast to a feed ratchet 201, as by a pin connection 202, cam and ratchet being held to rotate on a vertical axis by suitable means. Preferably an upper boss of the carriage 3 is bored and threaded at 203 to receive a tubular bearing member 204 internally bored at 206 for a stud shaft 205 having a lower conical head 207 and an upper shoulder 208 to position the cam 200. The upper reduced head 209 of the shaft 205 is threaded to receive an adjustment nut 210. Preferably the ratchet 201 is mounted on a hub 211 of the cam 200, which in turn rests upon an antifriction washer 212 engaging the upper face of the bearing sleeve 204. For further accuracy of movement of the cam 200 the cam may be splined at 213 to the shaft 205 to take up wear at washer 212, and be provided with set-screws 214 to fix it in adjusted position on shaft 205.

The cam 200 preferably is an end or barrel-cam having a lower spiral face 217 at a constant angle to the axis, so that motion about the axis 205 of the cam results in downward motion of the carriage 162 to a predetermined degree dependent upon the slope of face 217 and the angular displacement of the shaft 205, cam 200 and ratchet 201. The cam 200 is replaceable by other cams having different slopes, or in some cases, as when it is intended to shift the work by motion of table B or saddle C, having parts of two or more different spiral surfaces, or otherwise figured than as a constant-increment spiral.

Feeding motions measured by the axial displacement of the spiral surface of the cam 200 may be and preferably are given by rotating shaft 205 and ratchet 201 intermittently through such part of one whole revolution of the shaft as is desired to move the spindle 10 and its attached gear through the desired distance for a new cut. For a purpose presently to be described, so much of the surface of the cam 200 as may be involved in one or more of the intermittent feed motions given thereto may be a flat 215 (Fig. 12) so that when the wear-plate 190 is upon the flat 215 the ratchet 201 may be racked forward without altering the vertical position of the carriage 162.

The most and the least axially displaced portions of the active face of the cam 200 are joined by surface 216 in the axial plane, passage of which at the wear-plate 190 permits the springs 174 and plungers 173 to lift the spindle 10 to withdraw the cutter from the work. The stop devices above described are actuated near the end of this upward movement of the spindle.

The ratchet 201 is held from movement in a direction counterclockwise in Fig. 9 by a keeper pawl 320 pivoted at 321 in a horizontal slot in holder 322 bored for a spring plunger 323 acting on flat 324 of the pawl 320. The holder 322 is integral with a lug 325 pivoted on a clam screw 326 seated in the lug 96 of the carriage 3. The holder 322 can be swung on the pivot 326 by the thumb-screw 327 having a head taking into a slot 328 in the under side of the holder 322. A delicate adjustment is thus provided for the position of the active toe of the pawl 320 with respect to the center of the shaft 205 and of the point to which the ratchet 201 can recede when its driving pawl is withdrawn. The ratchet 201 is intermittently advanced whenever the worm gear 72 (Fig. 13) is in motion.

The arm 90 being laterally fixed with respect to the carriage 3, the arm 90 is available to be a carrier for or part of a connection for transmitting impulses received from a rotary element of the motion head, preferably the eccentric disk 70, to the means for moving forward the feed cam 200. As indicated above, the preferred means for moving the feed cam 200 is intermittently operative, comprising the ratchet 201, and an actuating pawl therefor, but it will be evident that the ratchet mechanism is not essential, and might instead be any of the well-known equivalent mechanical movements, and that the connection through the arm 90 might be any type of connection adapted to transmit power from, and to time the motions of the cam 200 from a rotary element mounted in the motion-head.

Referring now to Figs. 7, 9, 10, 13, 14 and 15, extension 171 is squared on the back face thereof, and slide bearings 220 (Fig. 13) and 221 are provided together to form a lateral slideway for a pawl-slide 223, urged to the left of Fig. 13 against a limit screw 222 for adjusting the stroke of the pawl locked in a bore in bearing 220 by a suitable lock-nut, by a spring 224 in a depression 225 in the slide bearing 221, said spring reacting against a lug 226 depending from the slide 223. The slide 223 is provided with a recess 228 to receive an actuator 229 adapted to give the slide limited reciprocal movement to the right in opposition to the spring 224. Feed pawl 230 for the ratchet 201 is pivoted in a horizontal slot in the slide 223 at 231 and held toward the ratchet by a spring plunger 232 (Fig. 9) housed in a bore in the slide 223 and taking against a flat on the pawl 230.

The actuator 229 is preferably pivoted on a stud 234 mounted on a plane surface 233 (Fig. 11) of carriage 3 back of the rib 160 and spindle 10, and is provided with a lug 235 taking into a recess 236 formed in the arm 90, adapted to house means for giving the lug 235 and actuator 229 and the slide 223 measured movements at predetermined times. To provide for the relative vertical motion with respect to the actuator 229 and its lug 235 of arm 90 the recess extends longitudinally of the arm 90 a sufficient distance, and is enlarged laterally to make room for the connections for giving the actuator 229 its motion. The cavity or recess 236 may be covered by a cover plate 237 screwed in a shallow recess of the arm 90, said plate having therein a slot 238 for lug 235 enlarged at 239 to permit lateral play of the lug 235 at the part of the slot 238 occupied by lug 235 when the feed movement occurs.

The connections in the arm 90 preferably comprise a plunger 240 housed in a parallel-walled lower extension 241 of the recess 236 and provided with an offset cam head 242, and having a rounded lower end 243 projecting into the bore in the arm 90 and into the path of cam surfaces 245, preferably 180° opposite on the disk 70.

The head 242 of the plunger 240 reacts with a driver 246, which preferably is a bell-crank as shown, pivoted at 247 within the recess 236, having an arm 248 to receive the vertical stroke of the plunger 240, thereby to rock the driver 246 about the pivot 247 as a center and move the vertical arm of the driver 246 to the right against the lug 235 in opposition to spring 224 to operate the actuator 229 whenever one of the cam surfaces 245 of the disk 70 passes the rounded end 243 of the plunger 240.

Overthrow of the driver 246 may be prevented as by an integral lug 250 of the arm 90 taking against a nose 251 of the driver 246. The driver 246 may be arranged to have a limited motion to the right of Fig. 14 or left of Fig. 13, thereby to limit the play of the slide 223, but preferably a constant stroke of the driver 246 is provided for, variation of the extent of the feed being obtained either by changing the cam 200 for another similar ratchet and cam having a different pitch of spiral face, or by adjustment at screw 222 of the back or recovery limit of the stroke of the driving or feed pawl 230, or both.

5. *Lubrication.*

As will be appreciated by users of automatic machine tools, effective lubrication of all working parts is essential. To enable use of such machines by the relatively unskilled, not only the parts of the machine but the oil entrances of its oiling system should be capable of access without taking the machine apart. The invention therefore comprises effective and simple means for lubricating the working parts.

Referring now to Figs. 9 and 11 the principal parts may be oiled by ducts having entrances at the top and front face of the milling head. The set-screw 16, for instance, is bored at $o'$, and the arm 5 is bored at $o^2$ to communicate with a duct $o^3$ in the boss 15 showering the thrust bearing 34, 35, 36, of shaft 30.

A circular boss on top of the motion head 1 carrying a three-armed cover $o^4$ and stop pin $o^5$ is bored for three oil-holes $o^6$, $o^7$, $o^8$, of which hole $o^6$ communicates with a pipe emptying into a duct $o^{10}$ and exterior oil-grooves $o^{11}$ in turn feeding perforations in the bearing sleeve 26 for the proper lubrication of the rotating shaft 30 and bushing 71.

Oil-hole $o^7$ communicates with a pipe $o^{12}$ (Figs. 11 and 13) feeding a pan $o^{13}$ at the bottom of the member 1, in which pan the periphery of the worm gear 72 dips.

Oil-hole $o^8$ is directly over a flared oil-hole $o^9$ in the bearing sleeve 121 for the worm shaft 105, and the lubricant here applied serves for the shaft 105 and thrust bearings at each end of the sleeve 121. Worm 120 is sufficiently oiled by application from gear 72.

The feed-cam shaft 209 is bored at $o^{15}$ to communicate with duct $o^{161}$, $o^{171}$, $o^{181}$, supplying all the bearing surfaces of this shaft and its attachments.

Spindle 10 and its associated parts preferably is oiled through covered inclined holes $o^{16}$, $o^{17}$, in the front face of carriage 3. Hole $o^{16}$ supplies the upper end of the spindle when in its lower positions through any of the holes $o^{18}$ in carriage 162.

Hole $o^{17}$ delivers to the annular spaces $o^{20}$, $o^{21}$ respectively surrounding the holes $o^{19}$ in the bushing 163 and spindle 10. The pumping action of spiral gear 60 takes oil in turn to the spiral gears 41 and 37.

Shaft 40 may be oiled through suitable holes $o^{22}$ on the bosses 43. Arm 90 and its attachments and the bearing surfaces of disk 70 are readily lubricated by oil applied in the cavity 236.

6. *Operation.*

The operations of the devices individually contributing to the whole result have been mentioned above in connection with their structure as described, and need not be repeated.

Attention is, however, called to the behavior of the described mechanism in performing such work as that illustrated in Figs. 3, 4 and 5. Supposing a suitable end mill $x$, which may be a fish-tail, two-lipped, cone-pointed or flat end mill, to be suitably mounted in the conical end 11 of the spindle 12 by means of a suitable collet $x^1$ and drawbar, and work such as a shaft W to be splinegrooved at $w$ to be positioned in the vise E and the saddle C and table B brought to a position under the axial plane of the cutter spindle 10, the ratchet 201 and its attached cam 200 is backed around until the index marks 207 of the ratchet indicating the depth of the spiral surface of the cam between such mark and the flat 215 read the desired depth for the cut to be made in the work. The height of the milling head may now be adjusted by the lever K or knee D, the work being brought upward until the point of the mill is in contact with the upper face of the work. The adjusting screw 77 for the disk 70, the devices being in the position of Fig. 13, is now accessible to be turned until the index mark 97 reads on the scale 95 the desired length of the groove to be cut less the diameter of the mill.

The machine is now ready to be started by pressing down on the starting plunger 142, which latches the arm 122 in a position to bring the worm 120 into driving contact with the worm gear 72, thereby to effect traverse of the carriage 3 to the desired extent and feeding into the work of the mill $x$ by operation of the cam 200.

By reason of the peculiarities of the traverse motion above set out, the relative motion of the mill $x$ with respect to the work is more rapid in the middle of the traverse than at the ends. It will be noticed that the cam surfaces 245 on the eccentric 70 are at a substantial angle, preferably a right angle as shown, with the axis of eccentricity of said disk. The consequence of this is that the plunger 240 is let down into the cam surface at 245 as the cutter $x$ is nearing the extreme of the traverse in one direction, and the driving pawl 230 for the feed ratchet is thus retracted prior to the end of the traverse, but the active part of the surface 245 serving to move the plunger 240 and rock the driver 246 to give the feed pawl 230 its driving movement, does not pass the plunger 240 until after the traverse in the opposite direction has begun. Some results of these motions are diagrammed in Fig. 5. Entrance upon the work is at $a$ and the traverse is complete at $a^1$. As illustrated by the arrow heads $a^2$, the feed motion is then concentrated in a narrow length of the slower part of the traverse in the opposite direction, and the cutter thereafter travels to the other end of the splinegroove at $a^3$ without any further feed movement. The slowly traversed cutter when reaching the left-hand end of the slot at $a^3$ easily takes out the material left by the entrance at $a$ short of the end of the path to be traversed. The opposite cam surface 245 of the disk 70 is now effective to again feed the cutter to the position $a^4$ during a slow movement of traverse. The work may thus proceed until a slot of the desired depth is cut in the work. As will be well understood by those skilled in the art, cross-sectional shapes of slots other than rectangular may be obtained by employing mills of the proper contour, or cupped mills be employed for shaping ends of small work.

When the desired depth has been reached, that is to say, when the cam 200 has been turned to force down the carriage 162 of the spindle 10 to the desired measured distance, the flat 215 reaches the follower 190 and remains upon it during at least one feed movement, and preferably through two feed movements of the actuating devices for the driving pawl 230. The purpose of this is to finish the bottom of the slot by traversing its full length with the cutter at the full measured depth thereof. At the beginning of the motion to the right of the carriage 3 at the end of this operation, the flat 215 runs off of the follower 190 and the plungers 173 withdraw the cutter, on the line of the arrow $a^5$ for instance (Fig. 5). As explained above, this motion causes stoppage of the traverse and the feed motions, and the machine is then ready to repeat the same operation on another piece of work. The change gears shown in Figs. 7 and 8 provide for seven or more variations in the ratio between strokes of the traverse and rotations of the cutter.

I am aware that those skilled in the art will not understand without further explanation how a vertical cutter of the type mentioned working in a comparatively deep slot in the upper surface of the work is enabled to continue in operation without fouling. I find that even at high speed of the cutter $x$ and under extreme conditions, as when a considerable depth of slot, of the order of two inches, and when a narrow slot, of the order of less than one-quarter of an inch is to be made, there is a sufficiently good clearance of chips from the work by the behavior of the oil showered upon the work from nozzle $S^4$. As shown in Fig. 4, the oil preferably reaches the cutter in the direction of the arrow $b$, when the cutter rotates as indicated by the arrow thereon. Whenever the slot $w$ reaches an appreciable depth the oil and chips in it are violently circulated in the direction of the arrows $b'$, with the result that the oil stream overflows at the rounded corners of the slot about on the line of the arrows $b^2$ with sufficient strength to deposit the chips beyond the ends of the slot and on either side of the longitudinal axis of the slot as indicated. This action of the oil in the slot becomes more marked as the slot grows deeper and the chips are washed out with invariable success, if the cutter is in proper condition.

I claim:

1. Milling mechanism comprising a frame, driving means on the frame, means to support the work, a milling cutter, means to actuate the cutter, and automatic means for moving the cutter in respect to the frame, the driving means and the work in at least two dimensions to shape the work.

2. Milling mechanism comprising means to hold the work, a milling cutter a frame for supporting the work and the actuating means, means to drive the cutter, and automatic means for moving the cutter in respect to its driving means and the work in at least two dimensions to shape the work, said motion in one dimension being a lateral traverse of predetermined extent.

3. Milling mechanism comprising a frame and means to support the work, a milling cutter, driving means on the frame and means driven thereby to rotate the cutter on its axis at different positions of said axis, and automatic means for moving the cutter in respect to the work in at least two dimensions to shape the work, said motion in one dimension being a traverse of predetermined extent at right angles to the cutter axis.

4. Mechanism for milling having therein a rotary cutter spindle and cutter, means to rotate said spindle and means to support the work, in combination with means for traversing the cutter back and forth in a predetermined path transverse to its axis of rotation having a rotary element fixed in relation to the work support, and automatic means acting on the spindle to move it axially for feeding the cutter into the work.

5. Mechanism for milling having therein a rotary cutter spindle, means to rotate said spindle, and means to support the work, in combination with means for traversing the cutter back and forth in a predetermined path transverse to the axis of rotation at rates differing from place to place in said path, and automatic means acting at one or more predetermined places only in said path to feed the cutter into the work during a slower rate of traverse near one end of its path of traverse.

6. Mechanism for milling having therein a rotary cutter spindle, means to rotate said spindle, and means to support the work in combination with means for traversing the cutter back and forth in a predetermined path transverse to the axis of rotation, means intermittently acting to feed the cutter a certain distance into the work and automatic means for predetermining the number of feed motions of the cutter prior to cessation of said feed motions, whereby automatically to enter the cutter into the work to a predetermined extent only.

7. Mechanism for milling having herein a rotary cutter spindle and cutter, means to rotate said spindle, and means to support the work, in combination with automatic means for causing approach of the cutter and work intermittently to feed the cutter into the work, means for traversing the cutter spindle and cutter laterally with respect to a rotary element and the traversing means at a rate of motion variable during the traverse, the feed motion coinciding with a slower part of the traverse and means for causing cessation of feeding motion of the cutter at the completion of a predetermined number of said motions.

8. Mechanism for milling having therein a rotary cutter spindle and cutter, means to rotate said spindle, and means to hold the work, in combination with automatic means for causing approach of the cutter and work to feed the cutter into the work and means for traversing the cutter spindle and cutter laterally at a rate of motion variable during the traverse from slow to fast, including a rotary element moving on an axis fixed in relation to the work, and means for predetermining operation of the feed means during the slower rate of traverse.

9. Mechanism for milling having therein a cutter spindle and cutter, means to actuate said spindle to operate the cutter and means to support the work, in combination with means for moving the cutter laterally in a predetermined path in respect to the work, automatic means for feeding the cutter into the work, and means for stopping the operation of the means for moving the cutter laterally at a predetermined time.

10. Mechanism for milling having therein a cutter spindle and cutter, means to actuate said spindle to operate the cutter and means to support the work, in combination with means for moving the cutter laterally in a predetermined path in respect to the work, automatic means for feeding the cutter into the work, and means for stopping the operation of the means for moving the cutter laterally acting when the cutter is at a predetermined part of said path.

11. Mechanism for milling having therein a rotary cutter spindle and cutter, means to rotate said spindle to operate the cutter and means to support the work, in combination with means for moving the cutter laterally in a predetermined path with respect to the work, automatic means for feeding the cutter into the work, and means for stopping the operation of the means for moving the cutter laterally acting when the cutter has made a predetermined number of rotations.

12. Mechanism for milling having therein a rotary cutter spindle, means to rotate said spindle, means to hold the work, means for traversing the cutter back and forth in a predetermined path transverse to the axis of rotation, and automatic means acting to feed the cutter into the work at a predetermined rate, in combination with automatic means for stopping the traverse when the cutter has been fed into the work during a predetermined time.

13. Mechanism for milling having thereing a rotary cutter spindle, means to rotate said spindle, and means to hold the work, means for traversing the cutter back and forth in a predetermined path transverse to the axis of rotation, and automatic means to feed the cutter into the work, in combination with means to withdraw the cutter from the work acting after the cutter has been fed to a predetermined extent into the work.

14. Mechanism for milling having therein a rotary cutter spindle, means to rotate said spindle, and means to hold the work, in combination with means for traversing the cutter back and forth in a predetermined path transverse to the axis of rotation, and intermittently acting means for feeding the cutter into the work to a predetermined extent a predetermined number of times, said means being adapted to cause withdrawal of the cutter from the work after a predetermined number of feeding motions.

15. Mechanism for milling having therein a rotary cutter spindle and cutter, means to rotate said spindle, and means to hold the work, automatic means for causing relative approach of the cutter and work to feed the cutter into the work, and means for traversing the cutter spindle and cutter laterally in a predetermined path, in combination with means for ceasing operation of the feeding means during traverse of the cutter in contact with the work throughout said path whereby to finish a surface of the cut in the work.

16. Mechanism for milling having therein a rotary cutter spindle and cutter, means to rotate said spindle, and means to hold the work, automatic means for causing relative approach of the cutter and work to feed the cutter into the work, and means for traversing the cutter spindle and cutter laterally, in combination with means for ceasing operation of the feeding means during one or more complete traverses of the cutter in contact with the work, and means then acting to withdraw the cutter from the work.

17. Milling mechanism having therein a traversing carriage, a cutter spindle mounted on said carriage, a motion head in respect to which the carriage is adapted to be traversed, means for driving the cutter spindle in operative relation to said spindle, and means for traversing said carriage while maintaining said relation having a rotary element on said motion head.

18. Milling mechanism having therein means to support the work, a motion-head normally stationary in respect to the work, supporting means, a traversing carriage and cutter spindle adapted to be traversed in respect to the motion-head and work in a predetermined path, and means on the motion-head for traversing the carriage and driving the cutter spindle in any of its positions.

19. Milling mechanism having therein a traversing carriage, a cutter spindle mounted on said carriage, a motion-head in respect to which the carriage is adapted to be traversed, means for driving the cutter spindle mounted in said motion-head in continuously operative relation to said spindle, means for traversing the said carriage, and means whereby the relative rate of spindle motion to traverse may be varied.

20. Milling mechanism having therein a traversing carriage, a cutter spindle movable with said carriage, a motion-head in respect to which the carriage is adapted to be traversed, means for driving the cutter spindle in continuously operative relation to said spindle, and means driven by an element of the means for driving the spindle for traversing said carriage at a predetermined rate.

21. Milling mechanism having therein a traversing carriage, a rotary cutter spindle on said carriage, a motion-head in respect to which the carriage is adapted to be traversed, means for driving the cutter spindle mounted on the motion-head and operative in any position of the said carriage, and means for traversing the said carriage through a predetermined path during a predetermined number of rotations only of said spindle.

22. Milling mechanism having therein a traversing carriage, a rotary cutter spindle on said carriage, a motion-head in respect to which the carriage is adapted to be traversed, means for driving the cutter spindle having a rotary element on the motion-head operative in any position of the said carriage and means for traversing the said carriage through a predetermined path during a predetermined number of rotations of said spindle, in combination with means for adjusting the extent of the path so traversed.

23. Milling mechanism having therein a traversing carriage, a cutter spindle on said carriage, a motion-head in respect to which the carriage is adapted to be traversed, means on the motion-head for driving the cutter spindle operative in any position of the said carriage, and means for traversing the carriage back and forth at rates more rapid in the middle of the traverse than at its ends.

24. Milling mechanism having therein a traversing carriage, a cutter spindle movable with said carriage, a motion-head in respect to which said carriage is adapted to be traversed, means for driving the cutter spindle in any position of said carriage, a rotary eccentric on said motion-head adapted to be driven at a predetermined rate in respect to the rotary motion of the spindle, and a connection for transmitting to said carriage reciprocating motions derived from said eccentric.

25. Milling mechanism having therein a traversing carriage, a rotary cutter spindle on said carriage, a motion-head in respect to which said carriage is adapted to be traversed, means for driving the cutter spindle in any position of the said carriage, a rotary eccentric on said motion-head adapted to be driven at a predetermined rate in respect to the rotary motion of the spindle, and means whereby the eccentricity of said eccentric may be varied.

26. In a machine for spline milling, a base including a work support, a motion head on the base, and a traversing carriage and means on the motion-head for traversing the carriage comprising an eccentric rotating part on the motion-head and a connection from the eccentric to the carriage having freedom of movement on said carriage in one dimension only whereby the driven element of the motion head may rotate on a relatively stationary axis.

27. The combination of a motion-head, a driving shaft thereon, a traversing carriage carrying a rotary spindle, and means for rotating said spindle from said shaft, an eccentric rotated by an operating connection to said shaft, and means on said carriage coacting with the eccentric for causing said carriage to be displaced in accordance with the angular position attained by said eccentric.

28. Mechanism of the class described having therein a drive-shaft, a rotary eccentric, means for rotating said eccentric from said shaft, in combination with a carriage movable in respect to said drive-shaft, an arm held to reciprocate in guides on said carriage at an angle to the direction of said carriage, means on said arm to cause it to follow the motion of said eccentric, and means for supporting and guiding said carriage.

29. Mechanism of the class described having therein a motion-head comprising a drive-shaft, a rotary eccentric, means whereby the eccentricity of said eccentric can be varied, means for rotating said eccentric from said shaft, in combination with a carriage movable in respect to said motion head an arm held to reciprocate in guides on said carriage at an angle to the direction of motion of said carriage, and means on said arm to cause it to follow the motions of said eccentric.

30. A milling head adapted for automatic operation of a milling cutter in respect to relatively stationary work having therein a vertical spindle for the milling cutter, a carriage horizontally movable for the spindle, a motion-head adapted to support the carriage, a driving shaft in said motion-head, and means adapted to drive said spindle from said shaft in any position of said carriage, in combination with an eccentric adapted to be driven at reduced speed from said shaft, and an arm free to move in vertical guides on said carriage taking over said eccentric, whereby to traverse the carriage and cutter at a rate related to the rotations of the cutter spindle.

31. The combination of an axially movable spindle and a carriage therefor adapted to move at an angle to the axis of said spindle, with means for supporting the carriage, an intermediate shaft for driving the spindle, gearing between the spindle and shaft adapted to remain in mesh in any position of the spindle, and means for positioning the spindle axially and laterally.

32. The combination of an axially movable spindle and driving pinion therefor, a traversing carriage for the spindle and means for supporting and traversing said carriage, with an intermediate shaft lying substantially in the direction of traverse of the carriage, a gear on said intermediate shaft adapted to engage and drive said driving pinion for the spindle in any position of the parts, and means for supporting and driving said intermediate shaft.

33. The combination of an axially movable spindle, and a spiral driving pinion thereon, a traversing carriage for the spindle and means for supporting and traversing said carriage, with an intermediate shaft lying substantially in the direction of traverse of the carriage, a spiral gear on said intermediate shaft adapted to engage and drive said driving pinion for the spindle in any position of the parts, and means for supporting and driving said intermediate shaft.

34. The combination of a driven spindle, a driving pinion therefor, a carriage for the spindle and means for supporting and traversing the carriage, with an intermediate driven shaft on the support for the carriage, means for driving said traversing means therefrom, a gear on said shaft adapted to engage and drive said driving pinion for the spindle in any position of the parts, and means for supporting and driving said intermediate shaft.

35. The combination for power transmission to a driven element of a primary shaft rotating in fixed position, a primary gear driven thereby, an intermediate shaft lying in another direction driven from said primary gear, and meshing spiral gears respectively on said intermediate shaft and said driven element, whereby said driven element may have motion in two dimensions laterally of the primary shaft within the extent of the faces of said spiral gears during maintenance of an operative driving connection.

36. Traverse mechanism substantially as and for the purposes described having therein a traversing carriage, an eccentric for moving the carriage in at least one dimension rotating in unison with a member of a gear train, an intermediate shaft adapted to drive instrumentalities on said carriage and said gear-train, and means whereby the gear ratio between said shaft and said member of the gear-train may be varied.

37. Variable traverse mechanism having therein in combination a traversing carriage, a gear, a disk adapted to be displaced on and held in predetermined eccentric positions on said gear, means on the carriage for causing it to follow the eccentric displacement of said disk on rotation of said gear in at least one dimension, and means for driving said gear at a predetermined speed.

38. Variable traverse mechanism having therein in combination a traversing carriage, a gear, a disk and micrometric adjusting means for displacing the disk on the gear, locking means for holding the disk in adjusted position on the gear, means on the carriage for causing it to follow the eccentric displacement of said disk on rotation of said gear in at least one dimension, and means for driving said gear at a predetermined speed.

39. Variable traverse mechanism for causing relative motion between a fixed part such as a motion-head and a movable part such as a traversing carriage thereon, having therein means for traversing the movable part including an adjustable eccentric, means whereby the motion of the eccentric may be stopped for adjustment at a maximum of the traverse in one direction, and a scale on one of said parts adapted to be read against the relative position of the other part for then showing the extent of the traverse.

40. In a variable traverse motion substantially as and for the purpose set forth, a variable eccentric comprising a gear, a disk adapted to be moved diametrically of the gear, means extending through slots in the gear for clamping the disk to one face of the gear, and wedges on the other face of the gear adapted to place said means under tension.

41. A variable traverse device having therein a carriage to be traversed horizontally, an arm in guides on said carriage permitting unlimited vertical freedom of movement and preventing horizontal freedom of movement in respect to the carriage, in combination with an eccentric adapted to be rotated in a bearing formed in said arm, and means whereby the eccentricity of the eccentric may be varied to alter the extent of the traverse of the carriage.

42. Milling mechanism having therein means to support the work, a milling cutter, a spindle for driving the cutter, actuating means associated with the means for supporting the work, and traversing means driven thereby for the cutter, and means adapted to move the spindle and cutter toward the work to feed the cutter into the work at a rate predetermined in relation to the rate of traverse of the cutter.

43. Milling mechanism having therein means having a fixed mounting for driving and laterally traversing a cutter in relation to relatively fixed work, in combination with means carried by the means for traversing the cutter for feeding the cutter into the work.

44. Milling mechanism having therein a support for a traversing carriage, a traversing carriage therein carrying a cutter spindle and cutter, means on said support for driving said spindle, and means for traversing the carriage, spindle and cutter, in combination with means for automatically moving the spindle relatively to the carriage to feed the cutter into the work as the operation progresses.

45. Milling mechanism having therein a motion-head, a carriage adapted to be traversed in respect to said motion-head, a cutter and spindle therefor adapted to be moved laterally with the traversing carriage, and adapted to be moved on the carriage axially of the spindle, and feeding means carried by said carriage and actuated from said motion-head for moving the cutter and spindle axially to feed the cutter into the work.

46. Milling mechanism having therein a motion-head, a carriage adapted to be traversed in respect to said motion-head, a driving train having elements carried by the motion head, means for traversing the carriage, a cutter and spindle therefor adapted to be moved laterally with the traversing carriage, and adapted to be moved on the carriage axially of the spindle, feeding means carried by said carriage and actuated by an element of the means for traversing the carriage for moving the cutter and spindle axially to feed the cutter into the work, and means on the motion head for predetermining the number of traversing motions.

47. Mechanism for milling having therein a cutter, a rotary spindle and a traversing carriage therefor, traversing means for the carriage comprising an eccentric and a connection to the carriage therefrom, and means for giving the spindle endwise motions for feeding having an element carried by said connection.

48. Mechanism for milling having therein a cutter, a rotary spindle and a traversing carriage therefor, traversing means for the carriage comprising an eccentric and a connection to the carriage therefrom, and means for giving the spindle endwise motions for feeding having an element carried by said connection and operated by said eccentric.

49. Milling mechanism having therein a cutter, a cutter spindle therefor, bearings for the spindle, means for moving the spindle, cutter and bearings laterally at an angle to the axis of the spindle, and automatic means for moving the spindle axially to feed the cutter into the work comprising means adapted to move a part bearing on the spindle through a predetermined distance during predetermined motion of the spindle laterally, and means under the control of the feeding means for stopping the lateral motion of the spindle.

50. Milling mechanism having therein a cutter, a cutter spindle therefor, bearings for the spindle, means for moving the spindle, cutter and bearings laterally comprising an arm moving laterally in one dimension with the spindle, a rotary eccentric for moving the arm, and means for moving the spindle axially comprising a cam surface on the eccentric, a connection carried by the arm, and means operated by said connection for moving the spindle axially.

51. Milling mechanism having therein a cutter, a cutter spindle therefor, bearings for the spindle, a carriage for moving the spindle, cutter and bearings laterally therewith, means comprising an arm moving laterally in one dimension on the carriage for moving the carriage, a rotary eccentric for moving the arm, and feeding means comprising a cam surface rotating with said eccentric, means movable laterally of said arm adapted to be moved by said cam-surface, and means on the carriage operated by said laterally movable means for moving the spindle axially.

52. Milling mechanism having therein a work support, a rotary spindle and cutter, a thrust bearing therefor, means for traversing the spindle and bearing, rotary means reacting with a part of said bearing to feed the cutter into the work, and automatic means for turning said feeding means through a predetermined angle of rotation to effect a predetermined depth of cut.

53. Milling mechanism having therein a rotary spindle and cutter, a thrust bearing therefor, rotary means reacting with a part of said bearing to feed the cutter into the work, and a ratchet mechanism for intermittently turning said means through a predetermined extent of angular motion.

54. Milling mechanism having therein a rotary spindle and cutter, a thrust bearing therefor, rotary means reacting with a part of said bearing to feed the cutter into the work, a ratchet mechanism for intermittently turning said means through a predetermined extent of angular motion, means on said rotary means for permitting withdrawal of the cutter from the work, and means for stopping the operation of the ratchet motion upon such withdrawal.

55. Milling mechanism having therein a rotary spindle and cutter, a thrust bearing therefor, means for traversing said parts, rotary means reacting with a part of said bearing to feed the cutter into the work, automatic means for turning said feeding means through a predetermined angle of rotation to effect a predetermined depth of cut, and means for causing operation of said traversing and feeding means to cease after a predetermined depth of cut is attained.

56. Milling mechanism having therein a rotary spindle and cutter, a thrust bearing therefor, rotary means reacting with a part of said bearing to feed the cutter into the work, automatic means for turning said feeding means through a predetermined angle of rotation to effect a predetermined depth of cut, and automatic means acting at a predetermined time after said depth has been attained to withdraw the cutter from the work.

57. Milling mechanism having therein a rotary spindle and cutter, a thrust bearing therefor, a rotary cam adapted to be manually positioned reacting with a part of said bearing to feed the cutter into the work, and automatic means for turning said feeding cam through a predetermined angle of rotation to effect a depth of cut, predetermined by the position of the cam when the operation begins.

58. Milling mechanism having therein a rotary spindle and cutter, a thrust bearing therefor, a rotary cam reacting with a part of said bearing to feed the cutter into the work, a ratchet mechanism for intermittently turning said cam through a predetermined angle a predetermined number of times, and means for traversing said parts in relation to relatively fixed work.

59. Milling mechanism having therein a rotary spindle and cutter, a thrust-bearing therefor, a rotary cam reacting with a part of said bearing to feed the cutter into the work, means tending to withdraw the spindle and cutter from the work, means to rotate said cam, a surface on said cam for retaining the spindle at a predetermined position, and a surface on said cam permitting the withdrawing means to act a predetermined angular rotation of the cam shall have taken place during operation of the spindle in said position.

60. Milling mechanism having therein a rotary spindle and cutter, feeding means acting on the spindle to feed the cutter into the work during operation of the mechanism, said feeding means having thereon means permitting operation of the feeding means without affecting the relative position of the cutter, whereby to make a finishing cut.

61. Milling mechanism having therein a rotary spindle and cutter, a cam and operating means therefor acting on the spindle to feed the cutter into the work during operation of the mechanism, said cam having thereon a flat permitting operation of the cam without affecting the relative position of the cutter.

62. The combination of a rotary eccentric, an arm having a bearing thereon for actuation thereby, a cam-follower carried by said arm, a cam-surface rotating with the eccentric for actuating the cam-follower, a carriage adapted to be reciprocated by said arm and eccentric, a ratchet-mechanism on said carriage, a driving pawl for said ratchet-mechanism, means movable on said arm adapted to be actuated by said follower, and means for operating said pawl adapted to be actuated by said movable means.

63. Means for operating devices carried by a reciprocating carriage comprising rotary means and a disk adapted to be adjusted thereon to a predetermined eccentric position, a cam-surface on said disk in certain relation to the axis of eccentricity, an arm bearing on the disk for reciprocating the carriage, a device on the carriage adapted to be operated at a predetermined place in the reciprocatory travel of the carriage, means carried by said arm and reacting with said cam-surface, and an operating connection between said means carried by the arm and said device.

64. Milling mechanism having therein a spindle and cutter and means for feeding the cutter into the work, means for withdrawing the cutter after a predetermined extent of operation, and means actuated upon withdrawal of the cutter for stopping further operation of the feeding means.

65. Milling mechanism having therein a spindle and cutter and means for traversing and for feeding the cutter into the work, means for withdrawing the cutter after a predetermined extent of operation, and means actuated upon withdrawal of the cutter for stopping further operation of the traversing and feeding means.

66. Milling mechanism having therein a traversing carriage, a cutter spindle and cutter thereon, and means for traversing the carriage and operating the spindle, in combination with means on the carriage for withdrawing the spindle and cutter from working position after a predetermined operation, and means actuated upon operation of said withdrawing means for stopping the means for traversing the carriage.

67. The combination with a rotary spindle and means to drive the spindle of a thrust-bearing therefor, means tending to move said bearing and spindle axially, and feeding means acting in opposition thereto, of means for permitting said spindle-moving means to act at predetermined times, and stop devices for said feeding means adapted to be actuated upon occurrence of such motion.

68. A milling machine having therein a motion-head, a traversing carriage, a spindle and cutter mounted on said carriage for movement axially of said spindle, means for traversing the carriage having a driven element on the motion-head, means to break the driving-connection to said driven element, and means on said carriage controlled by the axial position of said spindle for breaking said connection.

69. The combination of a carriage for a rotary spindle, means for traversing said carriage comprising a rotary eccentric, means for driving said eccentric comprising a gear rotating therewith, means for driving said gear normally in operative relation thereto, means for stopping the traverse of the carriage comprising devices for separating said gear and its driving means, and means for automatically moving the spindle in respect to said carriage.

70. The combination of a motion-head and traversing carriage for a rotary spindle, and means on the motion-head for traversing the carriage comprising a rotary eccentric, mean for driving the rotary spindle and rotary eccentric at related predetermined speeds, and automatic means operating after a predetermined number of revolutions of the spindle for stopping the motion of the rotary eccentric.

71. Milling mechanism having therein a motion-head, a carriage for a rotary spindle and means for traversing said carriage comprising a rotary eccentric, an intermediate shaft for driving the spindle, means for driving said eccentric comprising a gear rotating therewith, a worm driven from said intermediate shaft for driving said gear normally in operative relation thereto, and means for stopping the traverse of the carriage comprising devices for separating said gear and its driving worm.

72. In a machine of the class described, stop-motion mechanism adapted to disconnect a driven part from a part adapted to drive it having therein means for separating the driving from the driven part, a detent for holding said means in position for operative engagement of said parts, and a stopping plunger adapted to release the detent upon being actuated by movement of a part of the machine, said plunger including an extension adapted to be moved out of line with further movement of said part of the machine upon release of said detent.

73. In a milling machine having spindle feed devices, stop-motion mechanism adapted to disconnect a driven part of the feed devices from a part adapted to drive it having therein means for separating the driving from the driven part, a detent for holding said means in position for operative engagement of said parts, and a stopping plunger adapted to release the detent upon being struck by a part of the machine actuated by movement of the spindle in a direction opposite to its feeding motion.

74. In a machine of the class described, means for automatically stopping traverse means for a spindle adapted also to be moved axially for feeding, comprising means to break the driving connection for traversing said spindle, a detent normally preventing operation of said means, means for releasing said detent having a part operated upon axial movement of said spindle in a direction opposite to its feeding motion.

75. Milling mechanism having therein a motion-head and traversing carriage, a rotary cutter spindle and cutter mounted for axial motion on said carriage, and means on the motion-head for traversing the carriage comprising a rotary eccentric, an intermediate shaft on the motion-head for driving the spindle, and means adapted normally to drive the rotary eccentric from said intermediate shaft at a reduced speed comprising a gear fast to said rotary eccentric, drive means for the gear operated from said intermediate shaft, a rocker arm for said drive means, and means tending to swing said rocker arm and drive means out of operative contact with said gear, a detent to hold said arm in operative position, and means for releasing said detent adapted to operate on axial motion of predetermined extent of said spindle in one direction.

76. Milling mechanism having therein a motion-head, a traversing carriage and means for moving it, a cutter spindle on said carriage adapted to be traversed thereby, and a bearing for the spindle adapted to be moved on said traversing carriage at an angle to the direction of movement of said traversing carriage, means on the motion-head for stopping the motion of the traversing carriage, and means on the traversing carriage adapted to be positioned by motion of the spindle bearing for actuating said stopping means.

77. A milling head adapted for attachment to a milling machine of the type having a machine spindle normally adapted to hold a milling cutter and rotating in a certain position, said attachment comprising a motion-head and power transmission means therein adapted to be driven by the said machine spindle and having therein a cutter spindle lying at an angle to said machine spindle and adapted to be driven by said power transmission means, and devices for fastening the attachment to said machine.

78. A milling head adapted for attachment to a milling machine of the type having a machine spindle rotating in a certain position, said attachment comprising a motion-head and power transmission means therein adapted to be driven by the said machine spindle, and a cutter spindle lying at an angle to said spindle adapted to be driven by said power transmission means, means for traversing said cutter spindle laterally and devices for fastening the attachment to said machine.

79. A milling head for attachment to a milling machine of the type having a horizontal machine-spindle, having therein a motion-head, power-transmission means therein adapted to be driven by said horizontal machine-spindle, a vertical cutter spindle driven by said power transmission means, and automatic means for moving said vertical cutter spindle in relation to the remainder of the attachment, and means for attaching the milling head to the machine.

80. A milling head adapted for attachment to milling machines having therein a cutter spindle adapted to be actuated from a moving part of the machine to which it is attached, said milling head comprising a stud adapted to be received in the usual clamp bearing for the overhanging arm of the machine to which it is to be applied.

81. The combination with a cutter spindle of means for moving said spindle axially comprising a sleeve and thrust-bearings thereon taking against suitable shoulders on said spindle, a bearing for said sleeve, means to prevent its rotation therein, and cam means coacting with a part of said sleeve for feeding the spindle axially.

82. The combination with a cutter spindle of means for moving said spindle axially comprising a sleeve and thrust bearings thereon taking against suitable shoulders on said spindle, a bearing for said sleeve, lugs on said sleeve in slots in said bearing to prevent its rotation therein, and cam means coacting with one of said lugs to position said spindle axially.

83. The combination with a cutter spindle of means for moving said spindle axially comprising a sleeve and thrust-bearings thereon taking against suitable shoulders on said spindle, a bearing for said sleeve, lugs on said sleeve in slots in said bearing to prevent its rotation therein, cam means coacting with one of said lugs to feed the spindle axially, and stop mechanism coacting with one of said lugs to stop the feed motion at a predetermined position of said lug.

84. A feed-cam for use in a milling machine having a spiral end-face, a flat perpendicular to the axis of the spiral, and a face lying in the direction of said axis.

85. The combination with a spindle, a bearing therefor adapted to move the spindle endwise, and means for moving the spindle endwise comprising a cam reacting with a part of said bearing, means for mounting said cam to turn on an axis parallel to the spindle, a ratchet fast to said cam, a pawl therefor, and means for moving said pawl through an adjusted stroke at predetermined intervals.

86. The combination of a spindle adapted to rotate in an upright position of a spiral gear integral therewith, a coacting gear for driving the spindle, a bearing for the spindle having a counterbored upper part for oil, and means for moving the spindle at times axially to a low position, whereby the spiral gear takes oil upwardly by its rotary motion to lubricate its coacting gear.

87. In a milling machine, an inclosed motion-head having power-transmission shafting, gears and bearings therein, and a traverse-motion having a relatively large gear rotating therein, in combination with a system of oil-ducts leading to bearings and having exterior entrances at the top of the motion-head, and a dip-trough for said relatively large gear at the bottom of the motion-head.

Signed by me at Pawtucket, Rhode Island, this 15th day of March, 1918.

HERBERT G. BEEDE.